(12) United States Patent
Heni et al.

(10) Patent No.: US 12,422,700 B2
(45) Date of Patent: Sep. 23, 2025

(54) PLASMONIC DEVICE AND A METHOD FOR FABRICATING A PLASMONIC DEVICE

(71) Applicant: Polariton Technologies AG, Rüschlikon (CH)

(72) Inventors: Wolfgang Heni, Zurich (CH); Eva De Leo, Zurich (CH); Patrick Habegger, Zurich (CH)

(73) Assignee: Polariton Technologies AG, Rüschlikon (CH)

( * ) Notice: Subject to any disclaimer, the term of this patent is extended or adjusted under 35 U.S.C. 154(b) by 319 days.

(21) Appl. No.: 18/043,427

(22) PCT Filed: Aug. 18, 2021

(86) PCT No.: PCT/EP2021/072977
§ 371 (c)(1),
(2) Date: Feb. 28, 2023

(87) PCT Pub. No.: WO2022/043166
PCT Pub. Date: Mar. 3, 2022

(65) Prior Publication Data
US 2023/0324725 A1    Oct. 12, 2023

(30) Foreign Application Priority Data
Aug. 28, 2020 (CH) .................................. 01067/20

(51) Int. Cl.
*G02B 6/122* (2006.01)
*G02B 5/00* (2006.01)
*G02F 1/065* (2006.01)

(52) U.S. Cl.
CPC .............. *G02F 1/065* (2013.01); *G02B 5/008* (2013.01); *G02B 6/1226* (2013.01); *G02F 2203/10* (2013.01)

(58) Field of Classification Search
CPC .... G02B 5/008; G02B 6/1226; G02F 2203/10
See application file for complete search history.

(56) References Cited

U.S. PATENT DOCUMENTS 5,067,788 A * 11/1991 Jannson ................. G02F 1/195
385/2
6,584,239 B1    6/2003 Dawnay et al.
(Continued)

FOREIGN PATENT DOCUMENTS

CN        107632419 A  *  4/2021
EP        4148487 A1   *  3/2023
(Continued)

OTHER PUBLICATIONS

A. Tasolamprou et al. Liquid crystal-based dielectric loaded surface plasmon polariton optical switches. Journal of Applied Physics, 110, 093102, Nov. 2, 2011 (https://doi.org/10.1063/1.3658247) (Year: 2011).*

(Continued)

*Primary Examiner* — Michael Stahl
(74) *Attorney, Agent, or Firm* — Renner, Otto, Boisselle & Sklar, LLP

(57) ABSTRACT

The invention relates to a plasmonic device and a method for fabricating a plasmonic device. The plasmonic device comprises a substrate on which is arranged a plasmonic section which includes at least one inorganic confining structure adjacent to an organic optical material for providing a plasmonic waveguide. The organic optical material originates from one or more processes for arranging the organic optical material in a limited area. A protective layer is deposited for covering and/or enclosing the organic optical material for improved reliability of the plasmonic waveguide.

27 Claims, 12 Drawing Sheets

(56) References Cited

U.S. PATENT DOCUMENTS

| | | | |
|---|---|---|---|
| 10,585,245 | B1 | 3/2020 | Bian et al. |
| 10,684,530 | B1* | 6/2020 | Bian .................... G02F 1/29 |
| 2005/0002631 | A1 | 1/2005 | Yamaguchi et al. |
| 2010/0310205 | A1* | 12/2010 | Liu .................... B82Y 20/00 |
| | | | 385/12 |
| 2012/0057215 | A1* | 3/2012 | Suh .................... G02F 1/00 |
| | | | 359/240 |
| 2014/0091374 | A1 | 4/2014 | Assefa et al. |
| 2014/0233878 | A1 | 8/2014 | Goi et al. |
| 2015/0125111 | A1 | 5/2015 | Orcutt et al. |
| 2016/0072097 | A1 | 3/2016 | Trummer-Sailer |
| 2018/0081204 | A1* | 3/2018 | Ma .................... G02F 1/0027 |
| 2018/0364501 | A1 | 12/2018 | Jou et al. |
| 2019/0170937 | A1 | 6/2019 | Menezo et al. |
| 2019/0204506 | A1 | 7/2019 | Becker et al. |
| 2019/0237930 | A1 | 8/2019 | Lebby |
| 2020/0301177 | A1 | 9/2020 | Fujikata et al. |
| 2022/0269114 | A1* | 8/2022 | Nishi .................... G02F 1/035 |
| 2022/0326438 | A1* | 10/2022 | Messner .................... G02F 1/353 |

FOREIGN PATENT DOCUMENTS

| | | |
|---|---|---|
| WO | 9407176 A1 | 3/1994 |
| WO | 2005051525 A1 | 6/2005 |
| WO | WO 2012/103823 A2 * | 8/2012 |
| WO | 2016154764 A2 | 10/2016 |
| WO | 2019049681 A1 | 3/2019 |
| WO | 2021063548 A1 | 4/2021 |

OTHER PUBLICATIONS

V. Kravets et al. Graphene-protected copper and silver plasmonics. Scientific Reports, 4:5517, Jul. 1, 2014 (https://doi.org/10.1038/srep05517) (Year: 2014).*

F. Li et al. Monolithic silicon-based 16-QAM modulator using two plasmonic phase shifters. Optics Communications, 286, Jan. 1, 2013 (https://doi.org/10.1016/j.optcom.2012.08.068) (Year: 2013).*

Dinu et al., Environmental Stress Testing of Electro-Optic Polymer Modulators, J. of Lightwave Technology, vol. 27, No. 11, Jun. 1, 2009, pp. 1527-1532.

Oh et al., Recent Advances in Electrooptic Polymer Modulators Incorporationg Highly Nonlinear Chromophore, IEEE Journal of Selected Topcis in Quantum Electronics, vol. 7, No. 5, Sep./Oct. 2001, pp. 826-835.

PhD Thesis of Wolfang Heni, ETH Zurich, 2019, https://doi.org/10.3929/ethz-b-000353598.

International Search Report and Written Opinion mailed Oct. 28, 2021 in corresponding International Application No. PCT/EP2021/072977.

* cited by examiner

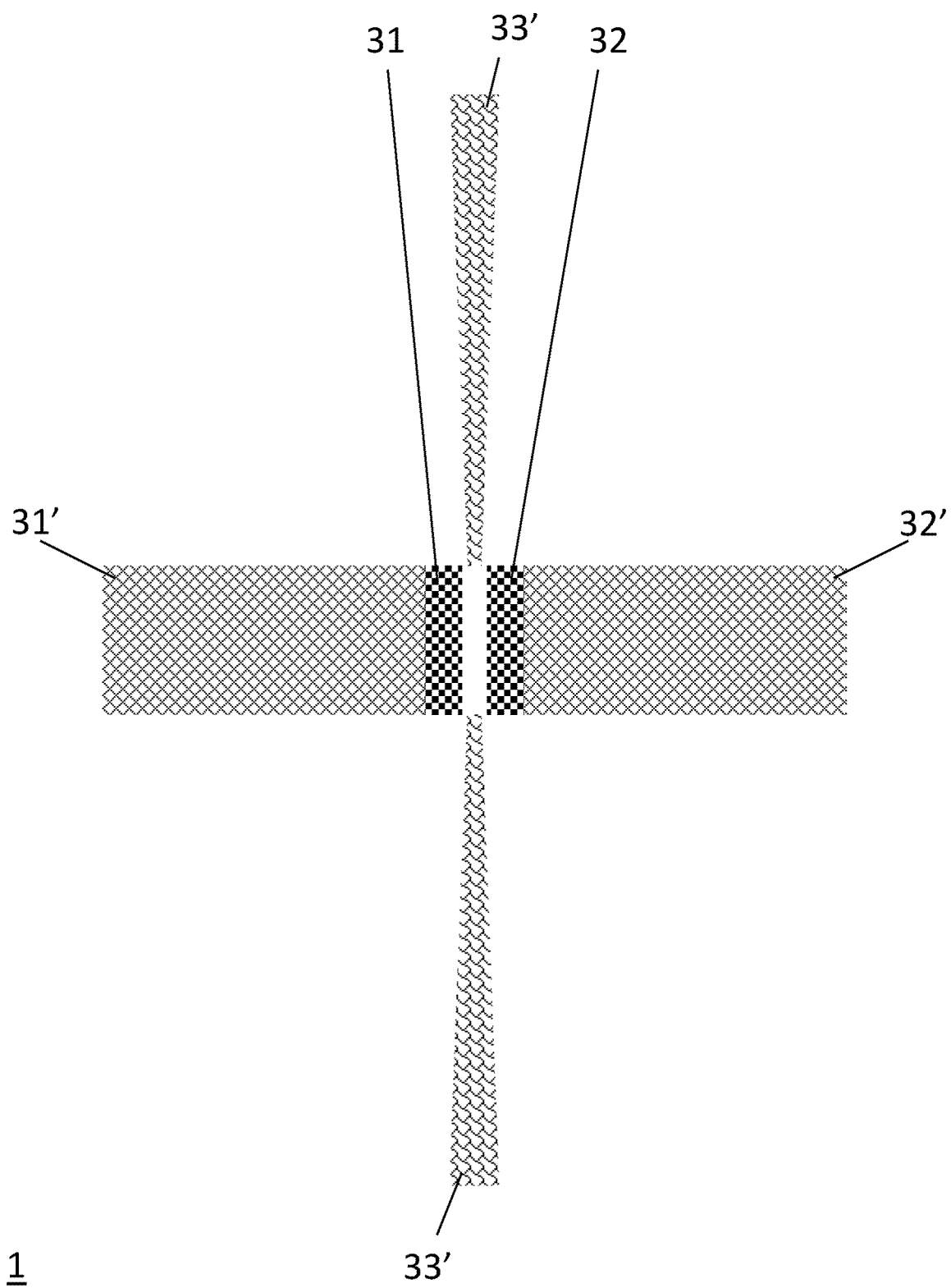
Fig. 12.1

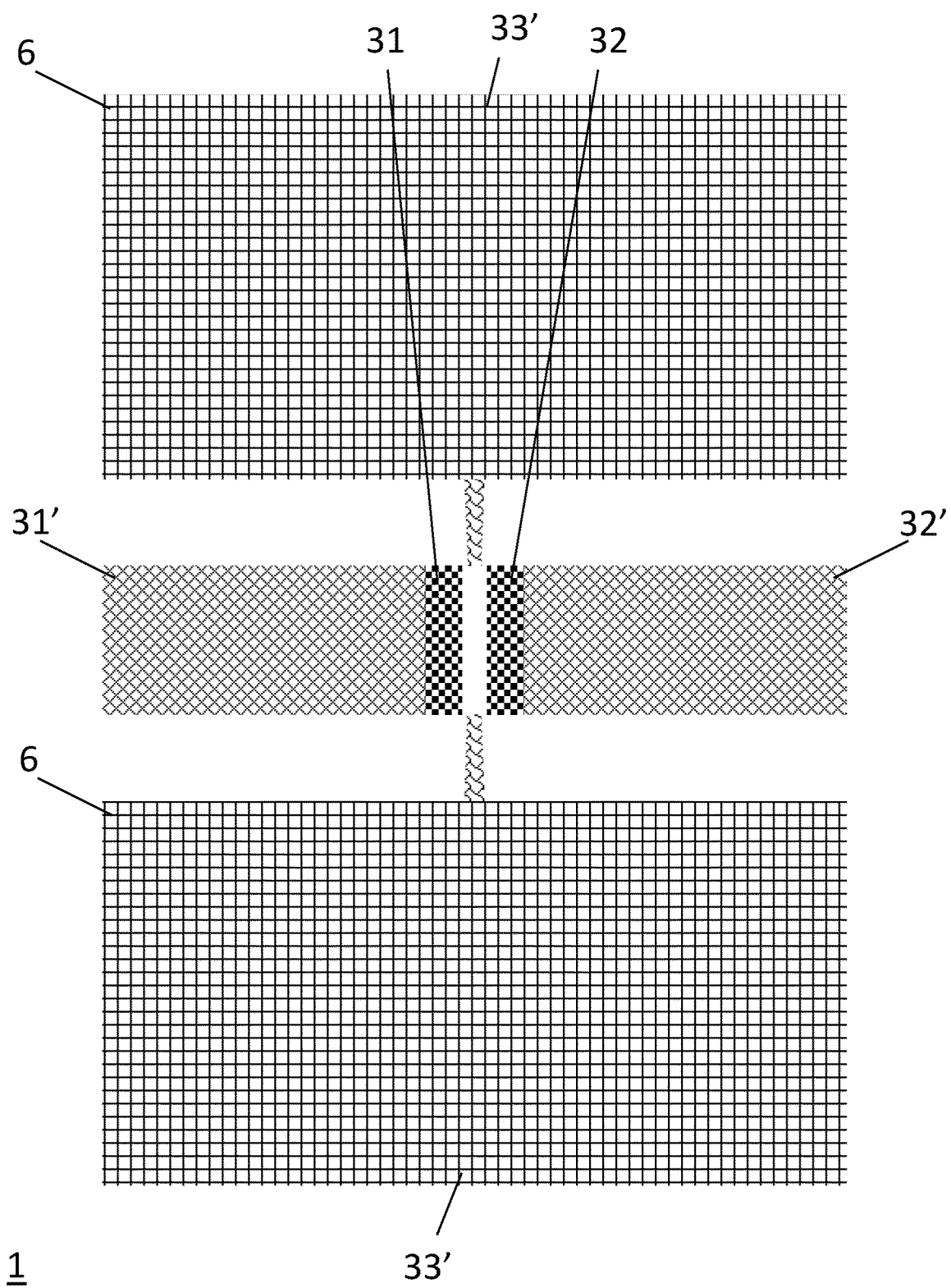
Fig. 12.2

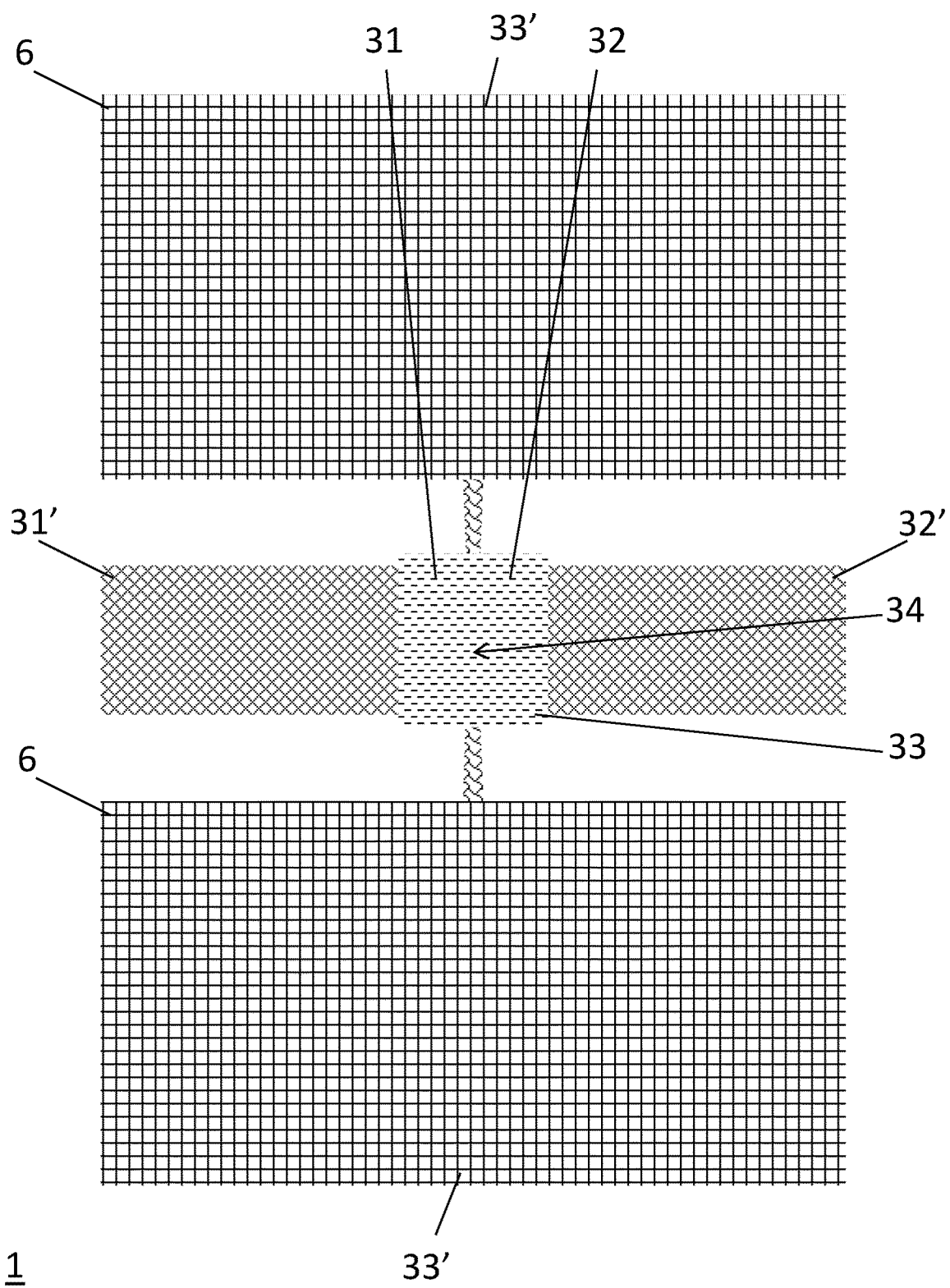
Fig. 12.3

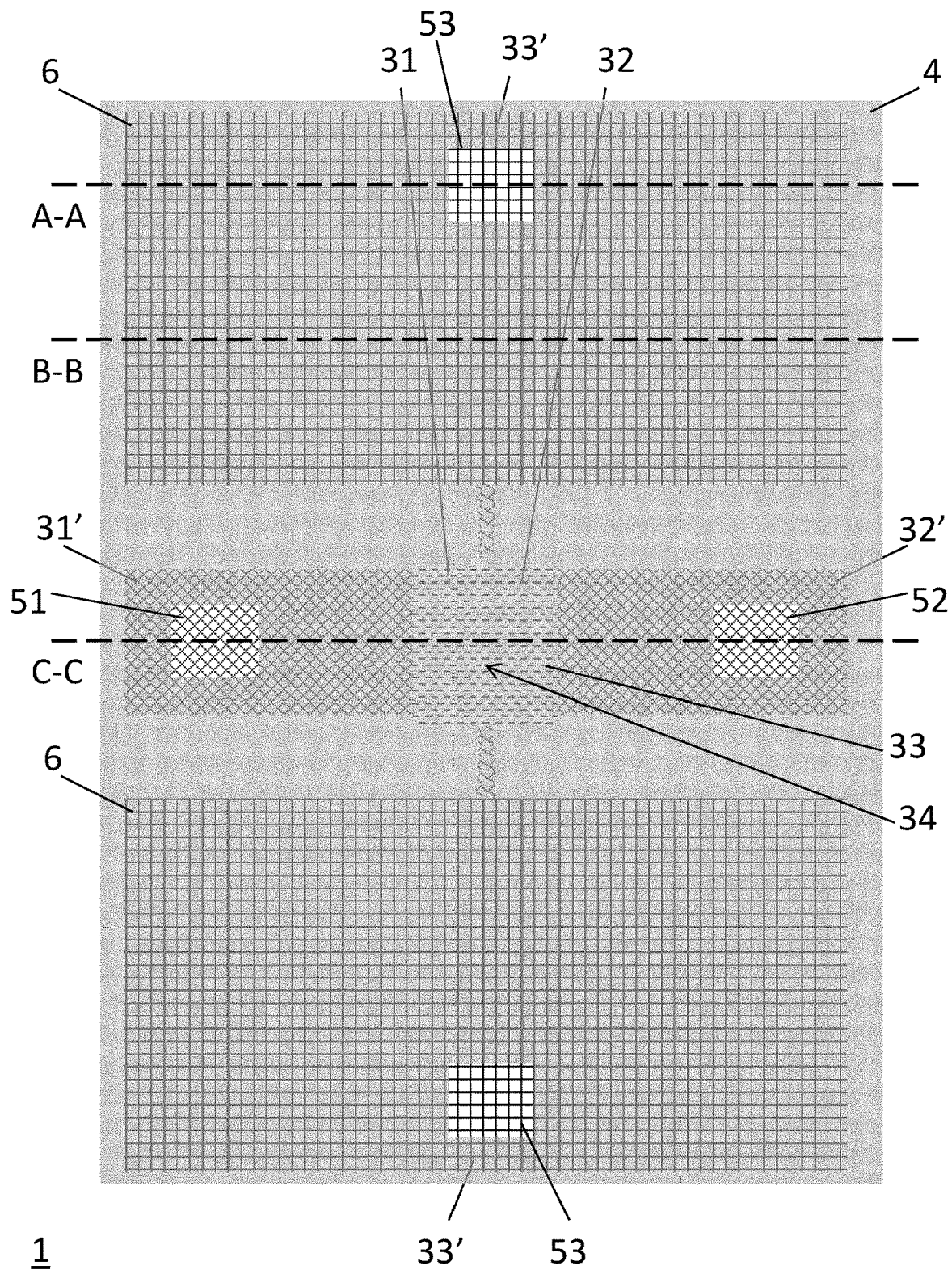
Fig. 12.4

PLASMONIC DEVICE AND A METHOD FOR FABRICATING A PLASMONIC DEVICE

This application is a national phase of International Application No. PCT/EP2021/072977 filed Aug. 18, 2021, which claims priority to Swiss Application No. 01067/20 filed Aug. 28, 2020, each of which is incorporated herein by reference in its entirety.

FIELD OF THE INVENTION

The present invention relates to a plasmonic device and a method for fabricating a plasmonic device.

BACKGROUND ART

Plasmonic devices have various configurations for enabling various applications. For example, plasmonic devices enable modulation of an optical signal in accordance with an electrical signal, for example, for high-speed data transmission. More specifically, plasmonic devices include a plasmonic waveguide which is provided by arranging an organic optical material between electrodes. An optical signal may be coupled into the plasmonic waveguide and modulated in accordance with an electrical signal applied to the electrodes. Plasmonic devices offer a solution to build electro-optical devices which simultaneously meet the requirements of a small footprint and high-speed operation. Plasmonic devices introduce materials with a negative real part of the permittivity, e.g., metals, to overcome the diffraction limit, to localize and guide light, and to offer intrinsic high-speed behaviour Heni, Wolfgang, "Plasmonic-Organic Hybrid Modulators", Doctoral Thesis ETH Zurich, https://doi.org/10.3929/ethz-b-000353598, discloses a plasmonic-hybrid technology, which combines highly nonlinear organic electro-optic materials with sub-wavelength confinement offered by plasmonic waveguides. The technology has been established as a viable technology platform with many demonstrations in a broad field of applications. Spin-coating enables depositing the organic electro-optic materials.

WO2021063548 discloses a plasmonic device comprising a substrate and a dielectric layer arranged between a base metal layer and a structured metal layer which form with respect to the substrate a vertical stack of layers.

WO2019049681 relates to optical modulators using the carrier plasma effect of silicon. A small optical modulator is disclosed capable of high-speed operation with low light loss and low required voltage. A rib waveguide structure includes a PN junction made of Si horizontally formed on a substrate and a Si1-xGex layer.

WO2019049681 does not disclose a plasmonic device. WO2019049681 does not disclose an organic optical material for providing a plasmonic waveguide. According to WO2019049681, a photonic waveguide is provided by a rib structure which includes an inorganic PN junction.

DISCLOSURE OF THE INVENTION

There may be a need for an improved plasmonic device avoiding some drawbacks of the prior art. More particularly, there may be a need for a plasmonic device having an improved reliability, such as short- or long-term reliability. More particularly, there may be a need for a plasmonic device having an improved reliability and providing a large electro-optic bandwidth. More particularly, there may be a need for a plasmonic device having an improved reliability and providing a large electro-optic bandwidth and having a small footprint. More particularly, there may be a need for a plasmonic device having an improved reliability and enabling simple fabrication.

Such a need may be met with the subject-matter of the independent claims. Advantageous embodiments are defined in the dependent claims.

Ideas underlying embodiments of the present invention may be interpreted as being based, inter alia, on the following observations and recognitions.

An aspect of the invention relates to a plasmonic device comprising: a substrate on which is arranged a plasmonic section which includes at least one inorganic confining structure adjacent to an organic optical material for providing a plasmonic waveguide, wherein the organic optical material originates from one or more processes for arranging the organic optical material in a limited area, and wherein a protective layer is deposited for covering and/or enclosing the organic optical material for improved reliability of the plasmonic waveguide. In particular, the plasmonic section has at the same time a small footprint and long-term reliability. The at least one inorganic confining structure is arranged adjacent to the organic optical material, wherein the at least one inorganic confining structure and the organic optical material provide the plasmonic waveguide. In principle, the at least one confining structure without organic optical material may be sufficient for providing the plasmonic waveguide. Arranging the organic optical material in a limited area enables preventing interactions of the organic optical material with components arranged on the substrate and/or enables preventing interactions during contacting or post-processing of the plasmonic device or other components on the substrate. The limited area of the organic optical material simplifies fully enclosing the organic optical material by a protective layer. In particular, the protective layer prevents or reduces short- or long-term degradation of desired properties of the organic optical material, thereby enabling an improved reliability of the plasmonic waveguide respectively the plasmonic section. The protective layer enables improving the power-handling capabilities of the plasmonic device, enables improving the operating lifetime, and/or enables reducing the temperature sensitivity of the plasmonic device. The protective layer enables protecting the organic optical material from chemical and/or physical influences. The protective layer simplifies post-processing of the plasmonic device. The protective layer enables protecting the organic optical material from glues and epoxies during packaging and/or post-processing steps.

In some embodiments, the at least one inorganic confining structure relates to at least one metallic confining structures.

The organic optical material may have an essentially homogenous design.

The plasmonic waveguide is provided by the organic optical material arranged adjacent to the at least one inorganic confining structure.

The organic optical material may be fully covered and/or enclosed by the protective layer, i.e., the protective layer may provide a hermetic sealing of the organic optical material.

The plasmonic device may be a hybrid device comprising a hybrid plasmonic section which includes a hybrid arrangement of an organic optical material and at least one inorganic confining structure. The at least one inorganic confining structure may include a plasmonic confining structure, i.e., which includes a plasmonic material, and a dielectric or semiconducting confining structure, i.e., which includes a dielectric or semiconducting material.

At least one of the at least one inorganic confining structure may originate from one or more first fabrication processes and the organic optical material may originate from one or more second fabrication processes, wherein the one or more first fabrication processes precede the one or more second fabrication processes. A geometry of the at least one inorganic confining structure, in particular a width, a length and/or a height of the at least one inorganic confining structure, may result from the first fabrication process. A geometry of a first one of the at least one inorganic confining structure with respect to a second one of the at least one inorganic confining structure, such as a gap between the first and second inorganic confining structure, may result from the first fabrication process.

At least one of the at least one inorganic confining structure may originate from one or more first fabrication processes and the organic optical material, and other ones of the at least one inorganic confining structure, if applicable, may originate from one or more second fabrication processes. The one or more first fabrication processes may have a higher precision and/or a higher quality than the one or more second fabrication processes.

In some embodiments, the organic optical material is an electro-optic material and/or the inorganic confining structures are electrodes or are electrically contacted to electrodes, for example, for enabling modulation or demodulation of an optical signal. The plasmonic device provides a large electro-optic bandwidth.

In some embodiments, the organic optical material includes an organic nonlinear optical material, in particular featuring a second-order (chi-2) and/or a third order (chi-3) nonlinearity, for example, for enabling frequency mixing, wave mixing, self- or cross-phase modulation, amplification or absorption, or other nonlinear processes of optical signals and/or electrical signals.

According to an embodiment of the invention, the one or more processes for arranging the organic optical material in a limited area include a local deposition process and/or a combination of a deposition process and a structuring process.

In some embodiments, the local deposition process and/or the combination of a deposition process and a structuring process include an ink-jet printing process, an aerosol printing process, a drop-casting process, a dispensing process, an etching process, a lift-off process, a local growth process, a mechanical or thermal structuring process, a masking process, and/or a lithographic process.

Thus, the organic optical material is arranged in a limited area by local deposition such as ink-jet printing, or by deposition in combination with structuring, such as spin-coating in combination with a lithographic process.

In some embodiments, the organic optical material originates from a process for depositing the organic optical material essentially in the form of a droplet in a limited area. For example, a surface of the optical material has the form of a droplet. The optical material may originate from a process for propelling and/or dispersing the optical material onto the plasmonic device, such as an ink-jet printing process.

According to an embodiment of the invention, the protective layer originates from one or more thin film deposition processes. A protective layer is provided for improving long term reliability of the plasmonic device.

In some embodiments, the one or more thin film deposition processes include an atomic layer deposition process, a sputtering process, a plasma-enhanced chemical vapor deposition process, a pulsed laser deposition process, a physical vapor deposition process, an epitaxial process, a molecular layer deposition process, a spin-coating process, a sol-gel process, a blade-casting process, a printing process, a dispensing process, a vapor deposition process, a chemical deposition process, a crystallization process, a bonding process, a gluing process, and a growth process.

According to an embodiment of the invention, the protective layer is configured for protecting the organic optical material from external influences. In particular, the protective layer is configured for protecting the organic optical material from degradation by oxygen, water, vapor, chemicals, gasses, etc., thereby improving long term reliability. Degradation of the organic optical material may relate to a reduction of functions of the organic optical material, such as functions relating to nonlinear properties, etc. The protective layer may be configured for providing a water-vapor transmission rate of below $1 \times 10^{-1}$ g/($m^2$ day), or below $1 \times 10^3$ g/($m^2$ day), or below $1 \times 10^5$ g/($m^2$ day). The protective layer may be configured for providing an oxygen permeation rate of below 100 $cm^3$/($m^2$ day), or below $1 \times 10^{-0}$ $cm^3$/($m^2$ day), or below $1 \times 10^{-2}$ $cm^3$/($m^2$ day), or below $1 \times 10^{-4}$ $cm^3$/($m^2$ day). Accordingly, reliability of the plasmonic waveguide respectively of the plasmonic section is improved.

According to an embodiment of the invention, the protective layer is configured for supporting heat dissipation from the organic optical material and/or the at least one inorganic confining structure. In particular, long-term reliability is improved.

In some embodiments, the protective layer originates form a one or more local deposition processes, such as drop-casting, dispensing, ink-jet printing, etc.

According to an embodiment of the invention, one of the at least one inorganic confining structure includes a plasmonic material and other ones of the at least one inorganic confining structure include a plasmonic material, a conductor, a semiconductor, and/or a dielectric element. The plasmonic material may include Au, Ag, Cu, Al, TiN, a material with a negative real part of the permittivity, etc. In particular, the integrated optical device enables a wide variety of applications.

According to an embodiment of the invention, the protective layer has a structured design which originates at least partially from one or more of a lithographic process, a masking process, a structuring process, a local growth process, and a local deposition process, wherein the structured design enables in particular electrically respectively optically connecting the plasmonic section, avoids unwanted influences of the protective layer on elements located on the substrate, or enables post-processing of elements located on the substrate. In particular, connection and/or coupling losses can be reduced, thereby enabling large bandwidth applications. The structured design may enable contacting or accessing further components of the plasmonic device, which further components may be related or may be unrelated with the plasmonic section. The structured design of the protective layer may enable post-processing of elements that may be related or may be unrelated with the plasmonic section According to an embodiment of the invention, the protective layer has a structured design which originates at least partially from connecting one or more of a further electrical component and a further optical component with the plasmonic section prior to depositing the protective layer.

For example, a depositing of a first protective layer may be followed by a wire-bonding, which may be followed by a depositing of a second protective layer.

According to an embodiment of the invention, the protective layer has a structured design which originates at least partially from partially or fully penetrating the protective layer for connecting a further electrical component and/or a further optical component for electrically respectively optically connecting the plasmonic section. In particular, the protective layer is partially destroyed, e.g., with probing needles or by a bonding process.

According to an embodiment of the invention, the protective layer includes an inorganic material, an organic material, and/or a combination thereof, in particular a mineral material, a material including micro-particles, nano-particles, an epoxy material, a sol-gel material, a 2D material, a polymer film, an organic material, a composite material, a nano-laminate, a metal, a semiconductor material, an insulating material, a glass, a ceramic and/or a dielectric. In particular, the protective layer can be adapted to requirements as regards long term reliability.

According to an embodiment of the invention, the protective layer relates to a coating arranged in accordance with a coating process.

According to an embodiment of the invention, the protective layer includes multiple sublayers. In particular, the multiple sublayers can be adapted to requirements as regards long term reliability, wherein e.g., a first sublayer can be adapted to requirements as regards external influences such as O2, H2O, etc. and a second sublayer can be adapted to enable heat dissipation. For example, the second sublayer for enabling heat dissipation can be arranged in closer proximity to the substrate than the first sublayer for enabling protection from external influences.

In some embodiments, the protective layer includes multiple sublayers. One or more sublayers may provide a function which is different from a protective function, such as functions for stabilization, adhesion, etc.

The multiple sublayers can be adapted to requirements as regards long term reliability, e.g., avoiding cracking or delamination of the film.

The multiple sublayers may be deposited by a thin-film process, by a local deposition process (drop-casting, dispensing, ink-jet printing, etc.), etc. For example, one sublayer may be deposited by a thin-film process, and another sublayer may be deposited by a local deposition process, such as drop-casting, dispensing, ink-jet printing, etc.

According to an embodiment of the invention, the device is configured to enable modulation of an optical signal in accordance with an electrical signal, and/or to enable modulation of an electrical signal in accordance with an optical signal. In particular, the plasmonic device can work as a modulator and/or as a demodulator.

In particular, a plasmonic waveguide enables a small footprint.

Furthermore, an aspect of the invention relates to a method for fabricating a plasmonic device. The method comprises: providing a substrate, arranging on the substrate a plasmonic section which includes at least one inorganic confining structure adjacent to an organic optical material for providing a plasmonic waveguide, wherein the organic optical material is arranged in a limited area, and depositing a protective layer for covering and/or enclosing the organic optical material for improved reliability of the plasmonic waveguide.

According to an embodiment of the invention, the organic optical material is arranged using a local deposition process and/or a combination of a deposition process and a structuring process.

According to an embodiment of the invention, the protective layer is deposited using one or more thin film deposition processes.

BRIEF DESCRIPTION OF THE DRAWINGS

In the following, advantageous embodiments of the invention will be described with reference to the enclosed drawings. However, neither the drawings nor the description shall be interpreted as limiting the invention.

FIGS. 12.1-4 schematically show top-views of a plasmonic device in accordance with some embodiments of the invention.

The figures are only schematic and not to scale. Same reference signs refer to same or similar features.

MODE(S) FOR CARRYING OUT THE INVENTION

Figure 1:
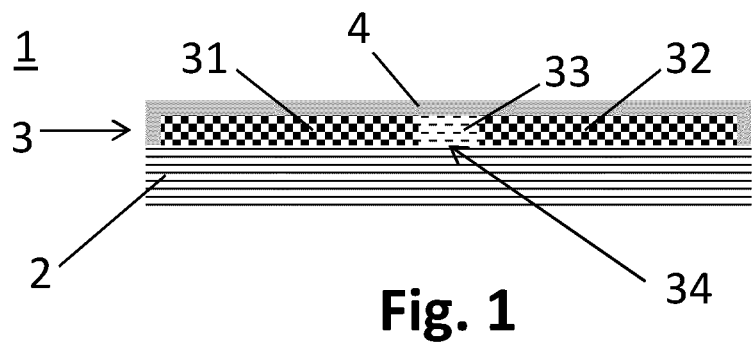
FIGS. 1-11, 11a schematically show cross-section views of a plasmonic device in accordance with some embodiments of the invention.

FIG. 1 shows schematically a plasmonic device 1 in accordance with some embodiments of the invention. The plasmonic device 1 comprises a substrate 2 on which is arranged a plasmonic section 3 which includes a first and a second inorganic confining structure 31, 32 adjacent to an organic optical material 33 for providing a plasmonic waveguide 34. The organic optical material 33 is arranged in a limited area.

As shown in FIG. 1, in some embodiments of the invention the inorganic confining structures 31, 32 and the organic optical material 33 are arranged on the substrate 2, and the organic optical material 33 is arranged between the inorganic confining structures 31, 32. A protective layer 4 is deposited for protecting the organic optical material 33 from external influences, and thereby for improving reliability of the plasmonic waveguide 34 respectively the plasmonic section 3. As shown in FIG. 1, in some embodiments of the invention the protective layer 4 covers the inorganic confining structures 31, 32 and the organic optical material 33 and partially covers the substrate 2.

Figure 2:
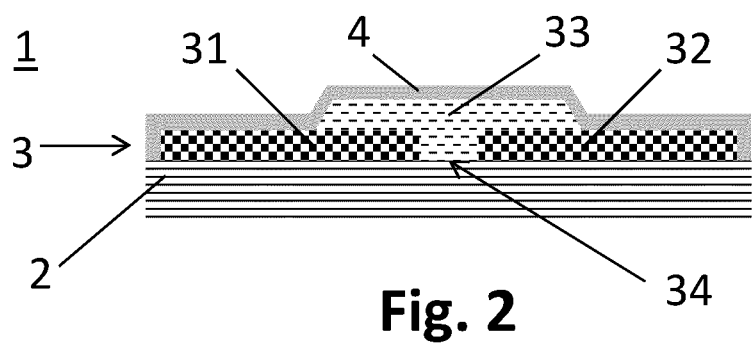

FIG. 2 shows schematically a plasmonic device 1 in accordance with some embodiments of the invention. In contrast to the plasmonic device 1 shown in FIG. 1, the organic optical material 33 partially covers the inorganic confining structures 31, 32. As shown in FIG. 2, the organic optical material 33 may have the shape of a drop respectively of a droplet. In other embodiments, the organic optical material 33 may have a different shape. In particular, the shape may depend on the process for arranging the organic optical material 33 in a limited area. The shape of the organic optical material 33 may result from the process for including the organic optical material 33 in the plasmonic section 3. The protective layer 4 extends from the substrate 2 on one side of the first inorganic confining structure 31 partially over the first inorganic confining structure 31, over the organic optical material 33 and partially over the second inorganic confining structure 32 to the substrate 2 on one side of the second inorganic confining structure 32.

In some embodiments, as illustrated in FIG. 2, the inorganic confining structures 31, 32 include a single material, such as Au, and enable contacting the inorganic confining structures 31, 32 with an electrical signal, for example.

In some embodiments, the inorganic confining structures 31, 32 include a first portion arranged adjacent to the organic optical material 33, and a second portion arranged adjacent to the first portion, and a third portion arranged adjacent to the second portion. The first portion may include a plasmonic material, the second portion may include a conductive material, or a material for capacitive coupling such as BaTiO3, and the third portion may include a conductive material for contacting, providing a plasmonic device 1. T plasmonic material is provided for enabling the plasmonic waveguide 34, wherein the second and third portion allow electrically contacting the devices. In some embodiments, the inorganic confining structures 31, 32 include a first portion of a plasmonic material such as Au, Ag, Cu, Al, TiN, a material with a negative real part of the permittivity, etc., wherein electrical contacts are not required for applications such as frequency mixing. Thus, the plasmonic device may be configured as a modifier circuit for receiving one or more optical signals and for generating a modified signal, such as for receiving an optical input signal which includes one or more input frequencies and for generating an optical output signal which includes one or more output frequencies in accordance with predefined arithmetic operations on the input frequencies, such as a duplication of an input frequency, a difference between input frequencies, etc. The predefined arithmetic operations may be achieved with an organic optical material 33 having a second order nonlinearity and/or a third order nonlinearity. In some embodiments, the inorganic confining structures 31, 32 include a first portion, such plasmonic material, and a second portion, such as a conducting material, which is spaced apart from the first portion.

Figure 3:
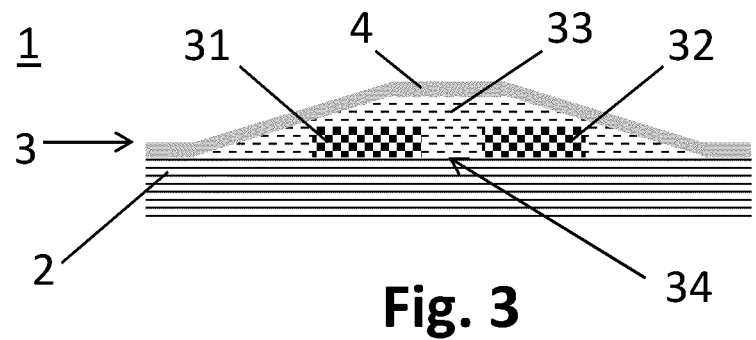

FIG. 3 shows schematically a plasmonic device 1 in accordance with some embodiments of the invention. In contrast to the plasmonic device 1 shown in FIG. 2, the organic optical material 33 partially covers the substrate 2 on the sides of the inorganic confining structures 31, 32 extending away from the plasmonic waveguide 34. The organic optical material 33 fully covers the inorganic confining structures 31, 32.

In some embodiments of the invention, the organic optical material 33 originates from a local deposition technique. In some embodiments of the invention, the organic optical material 33 originates from an ink-jet printing process, drop-casting process, aerosol printing process or another local deposition technique resulting in a drop-like deposition. In some embodiments of the invention, the organic optical material 33 originates from a lithographic process. In some embodiments of the invention, the organic optical material 33 originates from a structuring process applied prior to or after deposition of the organic optical material 33, such as a lithographic step including etching, lift-off, etc. In some embodiments the organic optical material 33 may be structured by mechanically, thermally, etc. removing portions of the organic optical material 33 after deposition, such as mechanically scratching, burning away with a hot needle, a laser, etc.

For example, FIG. 1 shows an organic optical material 33 which originates from a process having a higher precision than shown in FIG. 2, and FIG. 2 shows an organic optical material 33 which originates from a process having a higher precision than shown in FIG. 3. Precision of a process may be defined by a resolution which can be achieved by the process, such as 30 nanometer (nm), 100 nanometer (nm), 500 nanometer (nm), 1 micrometer (μm), 10 micrometer (μm), 100 micrometer (μm), etc.

In accordance with some embodiments of the invention, the limited area of the organic optical material 33 is at least ten times smaller than the area of the substrate 2.

In accordance with some embodiments of the invention, the limited area of the organic optical material 33 is at least ten times larger than the area of a gap between the inorganic confining structures 31, 32.

The present disclosure shows various embodiments of a plasmonic device 1 having a plasmonic section 3. The plasmonic section 3 includes a plasmonic waveguide 34 formed by inorganic confining structures 31, 32 and an organic optical material 33. In some embodiments of the plasmonic device 1, the inorganic confining structures 31, 32 are metals for forming a plasmonic slot waveguide that is filled with the organic optical material 33. An electrical signal may be connected to the inorganic confining structures 31, 32 for generating an electric field within the organic optical material 33.

The present disclosure shows various embodiments of a plasmonic device 1 comprising a substrate 2, inorganic confining structures 31, 32, an organic optical material 33 and a protective layer 4.

The substrate 2 may include a material such as Silicon, Silicon Oxide, Sapphire, Glass, Silicon Nitride, Silicon Oxynitride, III-V materials, Oxides, Nitrides, organic materials, dielectric, semiconductor, or insulating materials. The substrate 2 may be an silicon-on-insulator (SOI) substrate or an oxidized silicon wafer. The substrate 2 may be an electronic die or wafer containing CMOS circuits, bi-polar transistors, electronic circuits, etc.

The inorganic confining structures 31, 32 may include a plasmonic material including a metal such as Au (Au: Gold), Ag (Ag: Silver), Nickel (Ni), Cu (Cu: Copper), Al (Al: Aluminum), Ti (Ti: Titanium), or any other metal, or TiN (TiN: Titanium Nitride), or a material with a negative real part of the permittivity, or an alloy or a layer structure of them.

In some embodiments, a first inorganic confining structure 31 includes different materials than a second inorganic confining structure 32. The first inorganic confining structure 31 may include a plasmonic material as defined in the previous paragraph, and the second inorganic confining structure 32 may include a dielectric or semiconductor material such as Silicon, Silicon Oxide, Silicon Oxynitride, Silicon Nitride, Barium Titanate, Lithium Niobate, GaAs, III-V materials, etc.

The organic optical material 33 may include an organic non-linear optical material, in particular featuring a second-order (chi-2) or a third-order (chi-3) nonlinearity, such as an OEO material (OEO: organic electro-optic), an organic dye, organic crystals, organic electro-optic polymers, chromophores, composite materials, disperse red 1 (DR1), SEO100, SEO125, SEO250, GigOptix M3, JRD1, YLD124, HLD, AJCKL1 or any of the previous materials in a host material such as poly methyl methacrylate (PMMA) e.g. DR1 in PMMA or amorphous polycarbonate (APC) e.g. AJCKL1 in APC. The organic optical material may be a chromophore material. The organic optical material may haven a linear and/or a quadratic electro-optic effect. The organic optical material may have an electro-optic coefficient. The organic optical material may haven an electro-optic coefficient of $r_{33}$>30 pm/V or $r_{33}$>60 pm/V may, or $r_{33}$>100 pm/V or ideally $r_{33}$>140 pm/V. The optical material may have a glass transition temperature $T_g$. The organic optical material may have a glass transition temperature $T_g$>60° C., $T_g$>80° C., $T_g$>120° C., or $T_g$>160° C.

The organic optical material 33 may include liquid crystals, organic nanoparticles, quantum dots, organic materials, etc.

The protective layer 4 may protect the organic optical material 33 from degradation, thereby improving reliability of the plasmonic waveguide respectively the plasmonic section. The protective layer 4 may provide protection from external influences such as O2, H2O, humidity, solvents, plasma processes, mechanical influences, stress, etc. The protective layer 4 may reduce, limit, and/or remove chemical degradation of the organic optical material 33. The protective layer 4 may reduce, limit, and/or remove oxidation of the organic optical material 33. The protective layer 4 may reduce, limit, and/or remove the reduction of functions such as the nonlinearity of the organic optical material 33. The protective layer 4 may act as a heat conductive layer in order to dissipate heat from the inorganic confining structures 31, 32, the organic optical material 33, the plasmonic waveguide 34, etc. The protective layer may be configured for providing water-vapor transmission rates of below $1 \times 10^{-1}$ g/(m² day), or below $1 \times 10^{-3}$ g/(m² day), or below $1 \times 10^{-5}$ g/(m² day). The protective layer may be configured for providing oxygen transmission rates in the range of below 100 cm³/(m² day), or below $1 \times 10^{0}$ cm³/(m² day), or below $1 \times 10^{-2}$ cm³/(m² day), or below $1 \times 10^{-4}$ cm³/(m² day).

The protective layer 4 may originate from an atomic layer deposition process (ALD), a sputtering process, a plasma-enhanced chemical vapor deposition process (PECVD), a pulsed laser deposition process (PLD), a physical vapor deposition process (PVD), a molecular layer deposition process (MLD), a blade-casting process, a printing process, a spin-coating process and/or a sol-gel process. The protective layer 4 may include an inorganic material, an organic material, and/or a combination thereof. The protective layer 4 may have a multilayer design. The protective layer 4 may include a mineral material, a material including microparticles, nano-particles, a 2D material, a polymer film, a composite material, a metal, a semiconductor material, and/or an insulating material. The protective layer 4 may include glass, aluminum nitride, Al2O3, HfO2, SiO2, ZrO2, ZnO, SiN, silicon oxynitride, TiO2, TiN, organic materials, etc. The protective layer 4 may originate from a deposition process applied at temperatures below 200° C., below 140° C. or below 100° C. in order to prevent degeneration or loss of performance of the organic optical material 33.

In some embodiments of the invention, the plasmonic device 1 includes inorganic confining structures 31, 32 in the form of electrodes and includes an organic optical material 33 in the form of an electro-optic material for providing the plasmonic waveguide 34, and wherein an optical signal may be coupled into the plasmonic waveguide and modulated in accordance with an electrical signal applied to the electrodes.

In accordance with some embodiments of the invention, the plasmonic section 3 includes the inorganic confining structures 31, 32, and the organic optical material 33. The inorganic confining structures 31, 32 may include metallic or dielectric or semiconductor or multilayer structures. The inorganic confining structures 31, 32 may make use of organic optical materials 33, such as organic nonlinear materials, etc.

Figure 4:
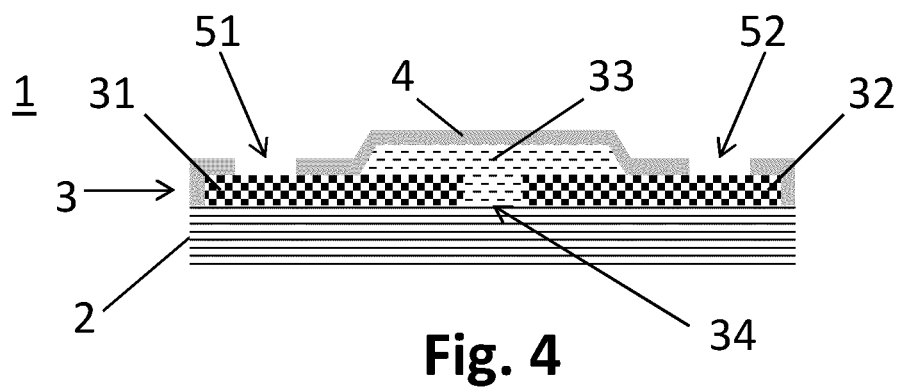

FIG. 4 shows schematically a plasmonic device 1 in accordance with some embodiments of the invention. In contrast to the plasmonic device shown in FIG. 2, the protective layer 4 has a structured design, wherein a first opening 51 enables access to the first confining structure 31 and a second opening 52 enables access to the second inorganic confining structure 32, for example, for connecting auxiliary electrical components such as electrical signal lines with the inorganic confining structures 31, 32.

Figure 5:
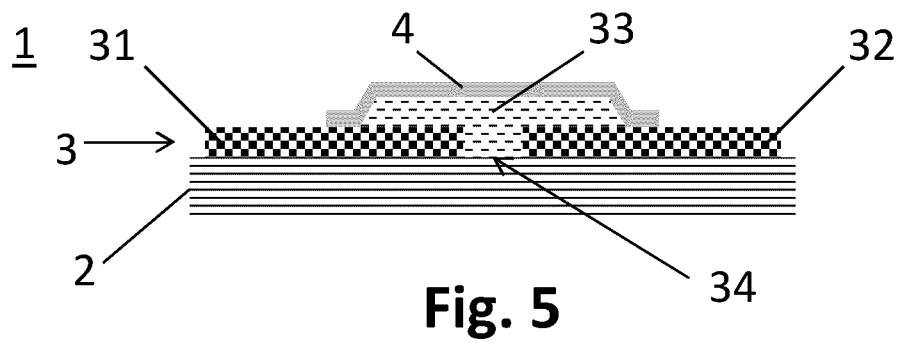

FIG. 5 shows schematically a plasmonic device 1 in accordance with some embodiments of the invention. In contrast to the plasmonic device shown in FIG. 2, the protective layer 4 has a structured design and only partially extends over the first inorganic confining structure 31 and the second inorganic confining structure 32, thereby providing access to the inorganic confining structures 31, 32, for example, for connecting auxiliary electrical components such as electrical signal lines with the inorganic confining structures 31, 32.

Figure 6:
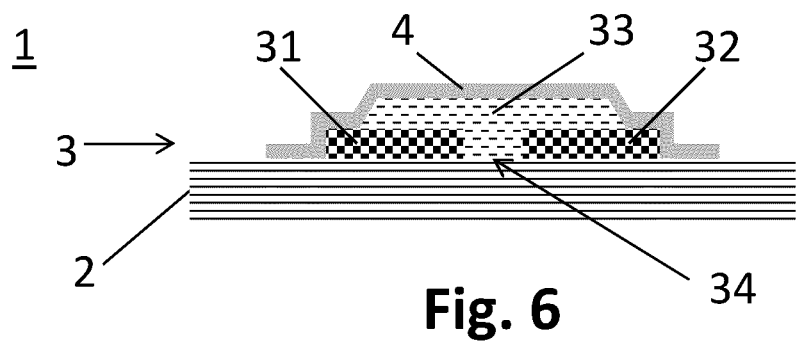

FIG. 6 shows schematically a plasmonic device 1 in accordance with some embodiments of the invention. In contrast to the plasmonic device shown in FIG. 2, the protective layer 4 has a structured design and only partially extends over the substrate 2, thereby providing access to the substrate 2, for example, for arranging auxiliary components on the substrate.

Figure 7:
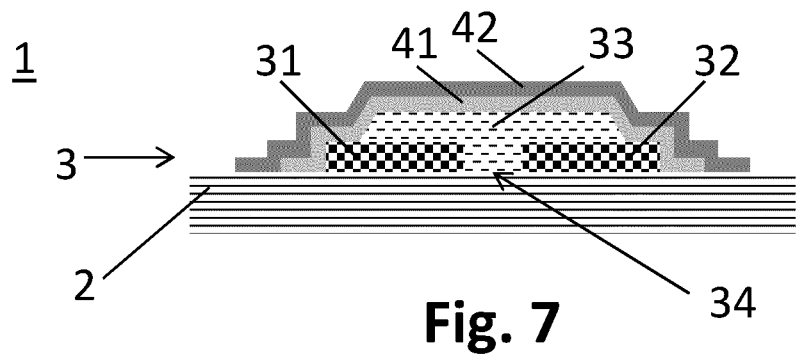

FIG. 7 shows schematically a plasmonic device 1 in accordance with some embodiments of the invention. In contrast to the plasmonic device shown in FIG. 6, the protective layer 4 includes a first protective sublayer 41 and a second protective sublayer 42. The first protective sublayer 41 covers the organic optical material 3, the inorganic confining structures 31, 32 and partially covers the substrate 2. The second protective sublayer 42 may cover the first protective sublayer 41 and may partially cover the substrate 2. The protective sublayers 41, 42 may have a structured design. In some embodiments of the invention, one or more of the protective sublayers 41, 42, may not have a structured design. In some embodiments of the invention, the protective sublayers 41, 42 originate from different deposition processes. In some embodiments of the invention, the protective sublayers 41, 42 include different materials. In some embodiments of the invention, one or more of the protective sublayers 41, 42 have a multilayer design.

In accordance with some embodiments of the invention, a plurality of protective sublayers 41, 42, . . . may be deposited, wherein different deposition processes and/or different materials may be involved. Thus, two or more protective sublayers 41, 42, . . . may be deposited. One or more of the protective sublayers 41, 42, . . . may have a structured design. One or more of the protective sublayers 41, 42, . . . may serve as a lithographic mask to locally open other protective sublayers 41, 42, . . . below. One or more of the protective sublayers 41, 42, . . . may serve as a mask for structuring the organic optical material 33, in particular for arranging the organic optical material 33 in a limited area.

In accordance with some embodiments of the invention, a first protective sublayer 41 may include an organic-inorganic multilayer (or an inorganic-organic multilayer). In accordance with some embodiments of the invention, the second protective sublayer 42 may include a (thick) organic or inorganic material for encapsulation. In accordance with some embodiments of the invention, the second protective sublayer 42 may include an epoxy, a photo resist, an electron-beam resist, a glue, etc.

Figure 7A:
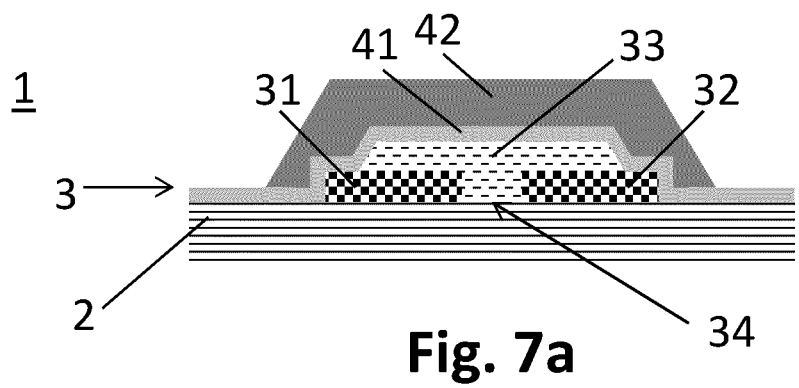

FIG. 7a shows schematically a plasmonic device 1 in accordance with some embodiments of the invention. In contrast to the plasmonic device shown in FIG. 7, a first protective sublayer 41 covers the substrate 2, the inorganic confining structures 31, 32, and the organic optical material 33. The first protective sublayer 41 may originate from one or more thin film deposition processes such as a sputtering process, an atomic layer deposition process, or a PECVD process. In contrast to the plasmonic device shown in FIG. 7, a second protective sublayer 42 has a structured design and partially covers the first protective sublayer 41, in particular covering about the area of the first sublayer 41 which is above the organic optical material 33 and the confining structures 31, 32. The second protective sublayer 42 may originate from a local deposition process, such as an ink-jet printing process or a dispensing process. The thickness of the second protective sublayer 42 may be larger than the thickness of the first protective sublayer 41.

Figure 8:
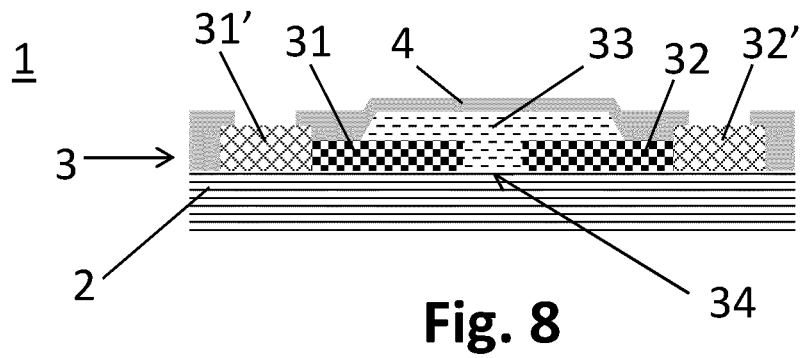

FIG. 8 shows schematically a plasmonic device 1 in accordance with some embodiments of the invention. In contrast to the plasmonic device shown in FIG. 2, auxiliary electrical components 31', 32' are arranged. For example, the auxiliary electrical components 31', 32' are electrodes adapted for being connected with further auxiliary components such as electrical lines and adapted for providing an electrical connection between these further auxiliary components and the inorganic confining structures 31, 32. As shown in FIG. 8, the protective layer 4 has a structured design, wherein the electrodes 31, 32 are covered by the protective layer 4 and the auxiliary electrical components 31', 32' are partially covered by the protective layer 4 in order to provide access to the auxiliary electrical components 31', 32'.

Figure 9:
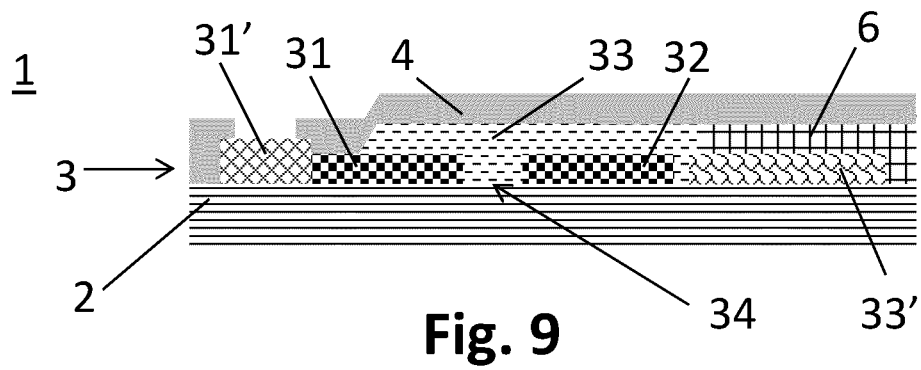

FIG. 9 shows schematically a plasmonic device 1 in accordance with some embodiments of the invention. In contrast to the plasmonic device shown in FIG. 8, an auxiliary optical component 33' is arranged. For example, the auxiliary optical component 33' is a photonic component, such as a photonic waveguide, a grating coupler, etc. As shown in FIG. 9, in some embodiments of the invention a cladding 6 may be arranged adjacent to the auxiliary optical component 33'. As illustrated in FIG. 9, in some embodiments of the invention the protective layer 4 may cover the cladding 6.

Contrary to the protective layer 4, the cladding 6 does not provide functions for protection from external influences such as O2, H2O, etc., because the cladding 6 is designed for improving operation of the auxiliary optical component 33', for example in photonics for providing the low-refractive-index material that surrounds the core of an optical fiber or a photonic optical waveguide to contain core light and providing a refractive index contrast to the core (or confining structure) and reducing surface scattering. In all-glass fibers, the cladding is glass. A cladding 6 as illustrated in FIG. 9 can be arranged on respective photonic materials included in an auxiliary component 33' such as photonic waveguides, photonic grating couplers, illustrated in FIG. 9, but cannot (or only hardly) be arranged on an organic optical material as disclosed in the present disclosure. Typically, the cladding 6 as illustrated in FIG. 9 is fabricated in a fabrication process prior to a fabrication process for arranging the optical material 33, because it is difficult to arrange the cladding 6 when the optical material 33 is already arranged.

Figure 10:
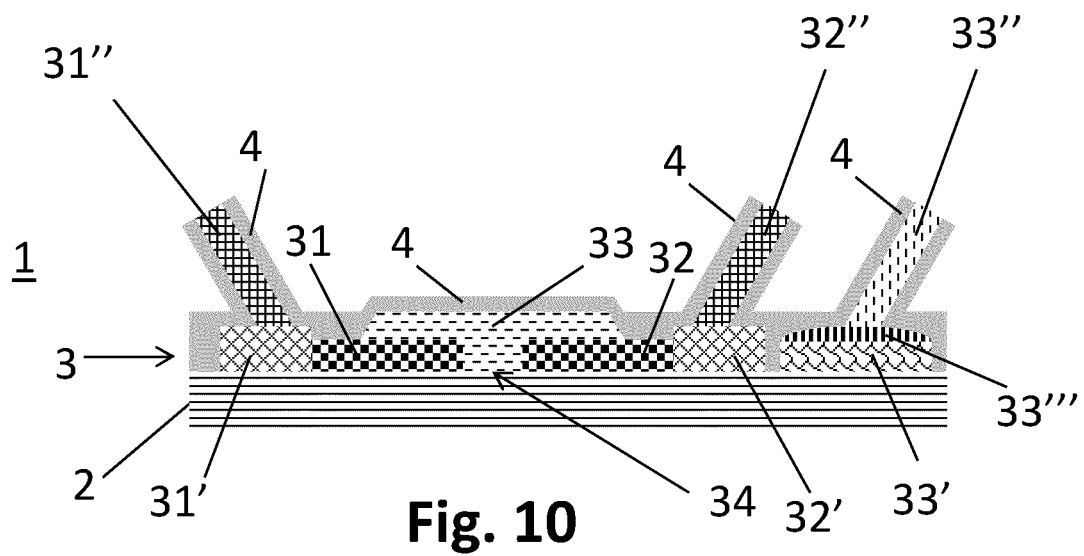

FIG. 10 shows schematically a plasmonic device 1 in accordance with some embodiments of the invention. In contrast to the plasmonic device shown in FIG. 9, further auxiliary electrical components 31", 32" are arranged and a further auxiliary optical component 33" is arranged. As shown in FIG. 10, the protective layer 4 covers the organic optical material 33 and the electrodes 31,32, partially covers the auxiliary electrical and optical components 31', 32', 33', and covers the further auxiliary electrical and optical components 31", 32", 33". The further additional auxiliary electrical and optical components 31", 32", 33" were arranged prior to depositing the protective layer 4, thereby effecting a structured design of the protective layer 4. As shown in FIG. 1, in some embodiments of the invention, an adhesive material 33"', for example, glue, epoxy, etc., may be arranged for connecting the further optical component 33" with the auxiliary component 33'. In some embodiments of the invention, the further electrical components 31", 32" are electrical signal lines. In some embodiments of the invention, the further optical component 33" is an optical signal line.

Figure 11:
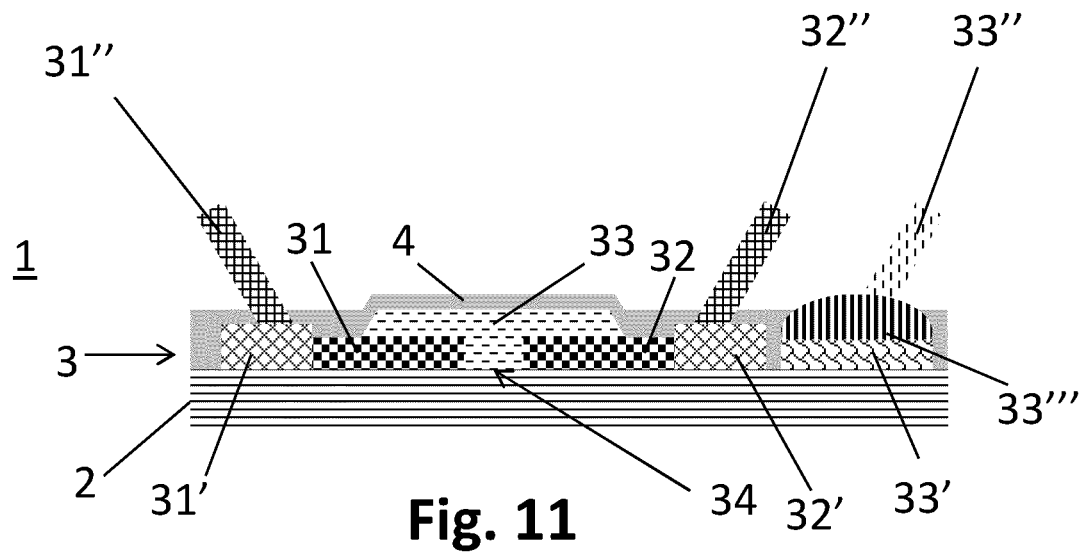

FIG. 11 shows schematically a plasmonic device 1 in accordance with some embodiments of the invention. In contrast to the plasmonic device shown in FIG. 10, the further electrical and optical components 31", 32", 33" are not covered by the protective layer 4. Thus, the further electrical and optical components 31", 32", 33" were arranged after depositing the protective layer 4. Accordingly, the protective layer 4 was partially or fully penetrated or structured for connecting the further electrical and optical components 31", 32", 33" with the plasmonic device 1, thereby providing a structured design of the protective layer 4. Partially or fully penetrating the protective layer 4 may result from a bonding process, a contacting process, etc.

Figure 11A:
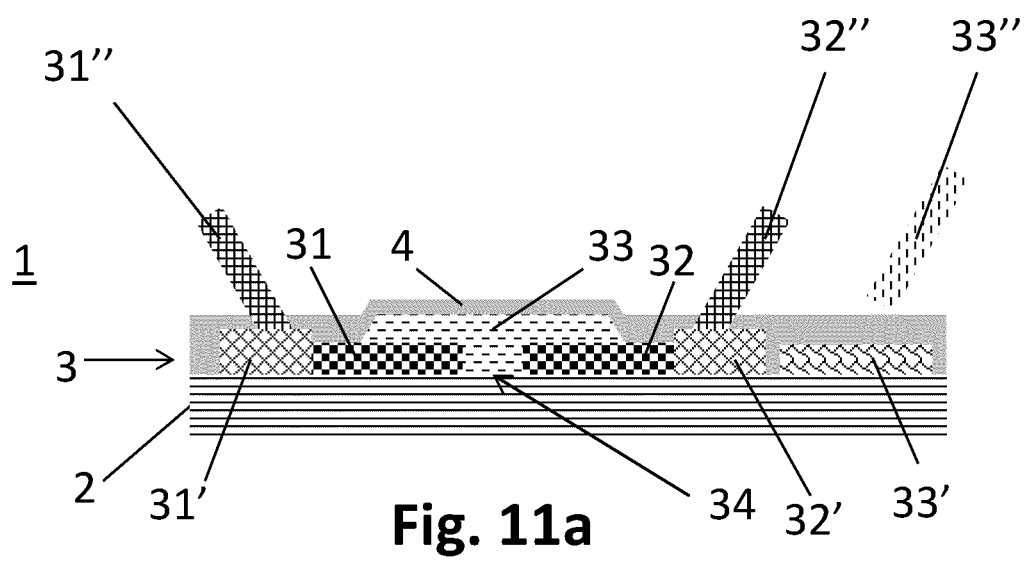

FIG. 11a shows schematically a plasmonic device 1 in accordance with some embodiments of the invention. In contrast to the plasmonic device shown in FIG. 11, an optical connection between the further optical component 33" and the auxiliary optical component 33' is established via the protective layer 4, wherein the protective layer 4 is not penetrated by the further optical component 33".

FIGS. 1-11, 13-21, 2a-c, 11a, 12a-d, 13a show a cross-section view of a plasmonic device 1 in accordance with some embodiments of the invention. FIGS. 12.1-4 show a top-view of a plasmonic device 1 in accordance with some embodiments of the invention.

FIGS. 12.1-4 show schematically a plasmonic device 1 in accordance with some embodiments of the invention. For reasons of clarity and visibility, FIGS. 12.1-4 do not show the substrate 2.

As illustrated in FIG. 12.1, the plasmonic device 1 includes inorganic confining structures 31, 32, which are spaced apart from each other via a gap. Adjacent to the inorganic confining structures 31, 32, auxiliary components 31', 32' are arranged. In some embodiments, the auxiliary components 31', 32' provide an electrical connection to the inorganic confining structures 31, 32. In some embodiments the inorganic confining structures 31, 32 and the auxiliary components 31', 32' may be formed by the same material and/or structure. In some embodiments, the auxiliary components 31', 32' may be formed by a different material and/or structure. Furthermore, auxiliary components 33' are arranged adjacent to the gap between the inorganic confining structures 31, 32. In some embodiments, the auxiliary components 33' provide an optical connection on both sides of the gap between the inorganic confining structures 31, 32.

As illustrated in FIG. 12.2, the plasmonic device 1 may include a cladding 6, which may at least partially cover the auxiliary components 33'.

As illustrated in FIG. 12.3, the plasmonic device 1 includes an organic optical material 33, which is arranged in a limited area on top of the inorganic confining structures 31, 32 and which fills the gap between the confining structures 31, 32. Thus, the inorganic confining structures 31, 32 are arranged adjacent to the organic optical material 33, wherein the inorganic confining structures 31, 32 and the organic optical material 33 provide a plasmonic waveguide 34. The organic optical material 33 is locally deposited by e.g., drop-casting, a printing process such as ink-jet printing, aerosol printing or may be structured after deposition.

As illustrated in FIG. 12.4, the plasmonic device 1 includes a protective layer 4, which covers the cladding 6, the auxiliary components 31', 32' and the organic optical material 33, and partially covers the auxiliary components 33'. The protective layer 4 is deposited for improving long term properties of the organic optical material 33. As illustrated in FIG. 12.4, the protective layer 4 has a structured design, wherein openings 51, 52 enable access to the auxiliary components 31', 32' and openings 53 support access to the auxiliary components 33'. In some embodiments of the invention, the structured design is the result of a lithographic process, a printing process, a shadow mask process, etc. In some embodiments of the invention, the structured design is the result of a lithographic step applied prior to depositing the protective layer 4. In some embodiments of the invention, the structured design is the result of a lithographic step applied after depositing the protective layer 4.

In accordance with some embodiments of the invention, areas or sections of the protective layer 4 may be removed using other techniques wherever the protective layer 4 is not required.

In accordance with some embodiments of the invention, depositing a protective layer 4 having a structured design allows for contacting electrodes, accessing optical interfaces, or post-process certain areas of chip.

Figure 12A:
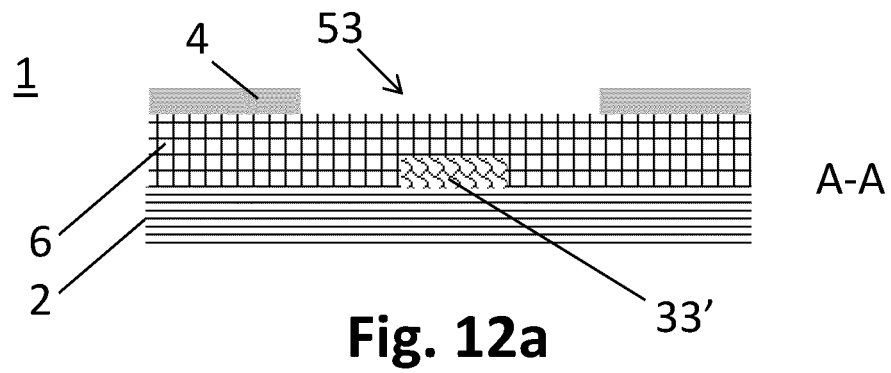
FIGS. 13-21, 12a-d, 13a schematically show cross-section views of a plasmonic device in accordance with some embodiments of the invention.

FIG. 12*a* illustrates schematically the cross-section view A-A of the plasmonic device 1 illustrated in FIG. 12.4. The auxiliary component 33' is arranged on the substrate 2. The cladding 6 is arranged on the auxiliary component 33' and the substrate 2. The protective layer 4 is arranged on the cladding 6. The protective layer 4 includes an opening 53 for supporting access to the auxiliary component 33'.

Figure 12B:
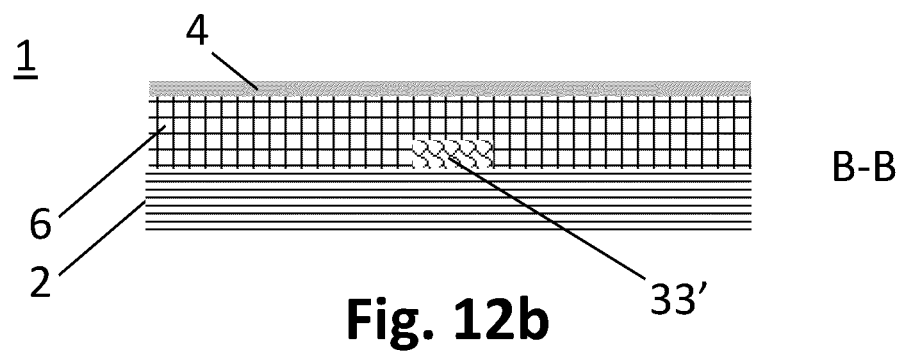

FIG. 12*b* illustrates schematically the cross-section view B-B of the plasmonic device 1 illustrated in FIG. 12.4. The auxiliary component 33' is arranged on the substrate 2. The cladding 6 covers the auxiliary component 33' and the substrate 2. The protective layer 4 covers the cladding 6.

Figure 12C:
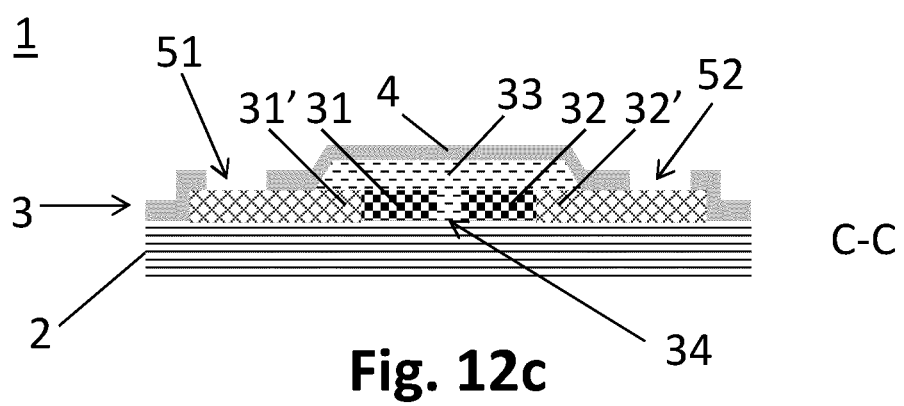

FIG. 12*c* illustrates schematically the cross-section vie C-C of the plasmonic device 1 illustrated in FIG. 12.4. The inorganic confining structures 31, 32 are arranged on the substrate 2. The auxiliary components 31', 32' are arranged on the substrate 2 adjacent to the inorganic confining structures 31, 32. The organic optical material 33 is arranged on the inorganic confining structures 31, 32 and partly on the auxiliary components 31', 32'. The organic optical material 33 fills the gap between the inorganic confining structures 31, 32. The protective layer 4 covers the organic optical material 33 and the auxiliary components 31', 32' and partly covers the substrate 2. The protective layer has a structured design, wherein openings 51, 52 enable access to the auxiliary components 31', 32'.

Figure 12D:
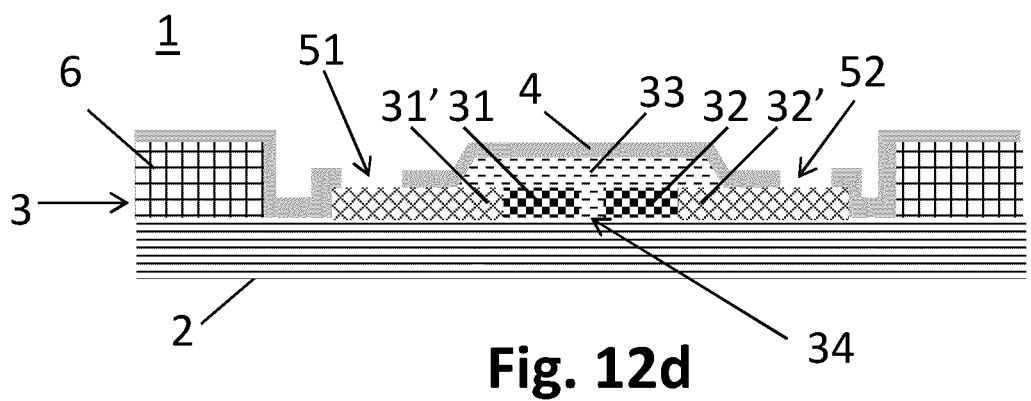

FIG. 12*d* illustrates schematically the cross-section view of the plasmonic device 1 as illustrated in FIG. 12*c*. A cladding 6 is arranged spaced apart from the auxiliary components 31', 32'. The protective layer 4 also covers the cladding 6.

Figure 13:
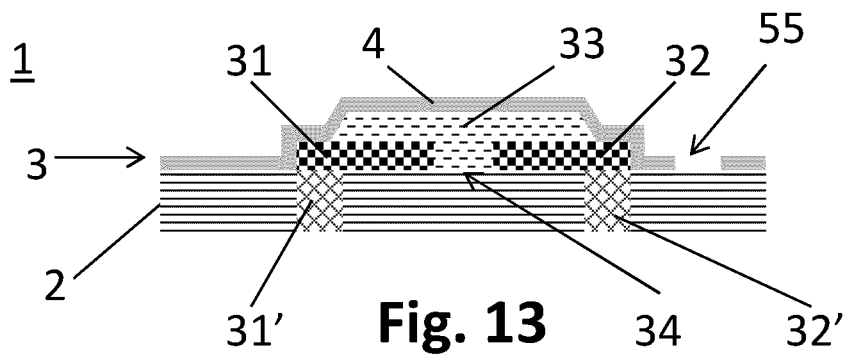

FIG. 13 shows schematically a plasmonic device 1 in accordance with some embodiments of the invention. In contrast to the plasmonic device illustrated in FIG. 2, auxiliary electrical components 31', 32' are arranged which extend through the substrate 2 for enabling electrically connecting the plasmonic section 3. As shown in FIG. 13, in some embodiments of the invention the protective layer 4 may include an opening 55, for example, for arranging auxiliary optical components.

Figure 13A:
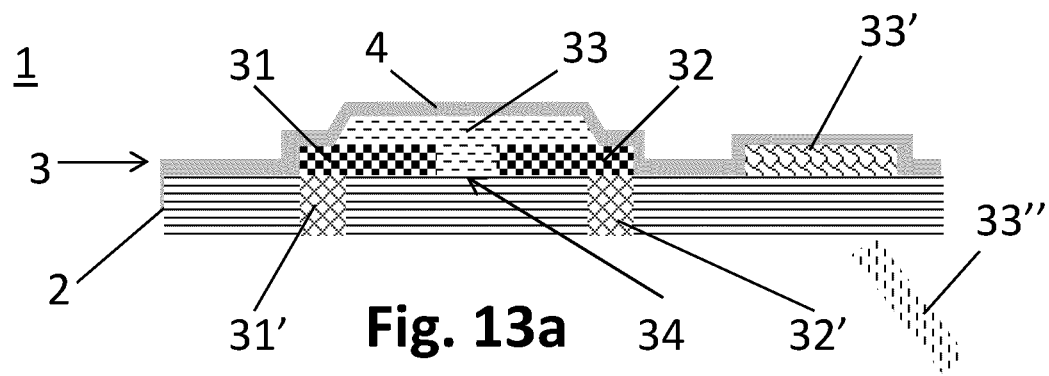

FIG. 13*a* shows schematically a plasmonic device 1 in accordance with some embodiments of the invention. In contrast to the plasmonic device illustrated in FIG. 13, an auxiliary optical component 33' is arranged and a further optical component 33" is arranged, wherein optical connection between the auxiliary optical component 33' and the further optical component 33" occurs via the substrate 2, in particular with or without penetrating the substrate 2.

Figure 14:
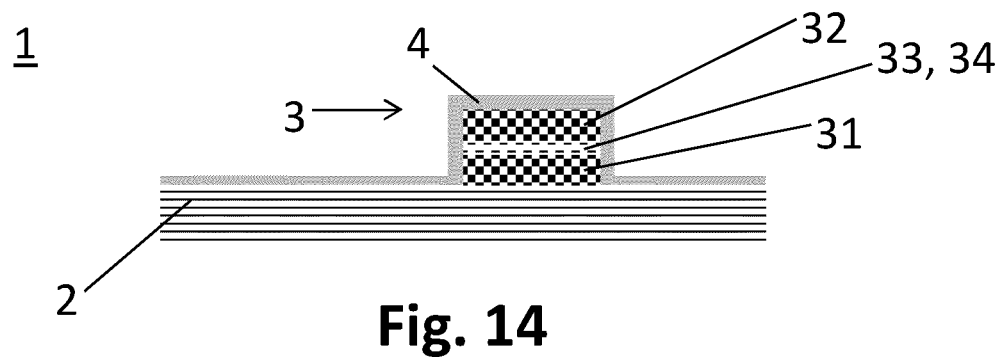
Figure 14A:
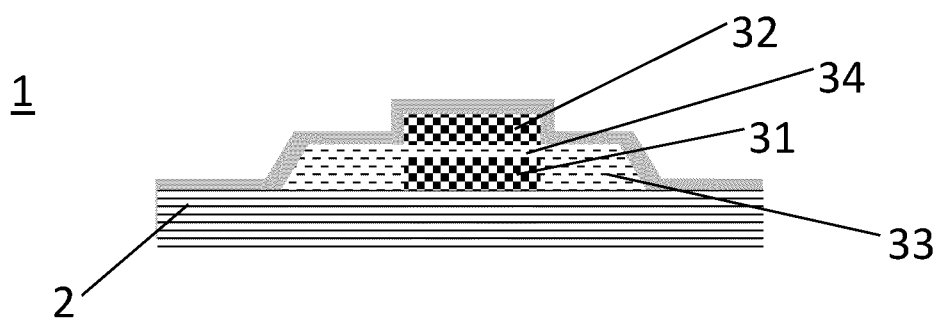

FIGS. 14, 14*a* show schematically a plasmonic device 1 in accordance with some embodiments of the invention. In contrast to the plasmonic device shown in FIG. 1, the plasmonic section 3 includes inorganic confining structures 31, 32 and an organic optical material 33 which are vertically arranged for providing a plasmonic waveguide 34. The protective layer 4 covers the substrate 2 and the plasmonic section 3.

According to FIG. 14, the cross-section of the inorganic confining structures 31, 32 and the organic optical material 33 have a rectangular form. According to FIG. 14*a*, a first inorganic confining structure 31 is arranged on the substrate 2, wherein the organic optical material 33 covers the first inorganic confining structure 31 and partly covers the substrate 2.

Figure 15:
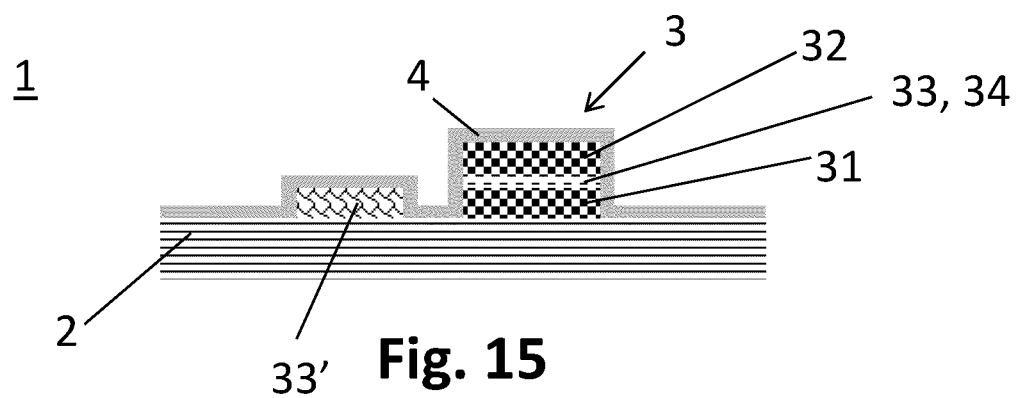

FIG. 15 shows schematically a plasmonic device 1 in accordance with some embodiments of the invention. In contrast to the plasmonic device shown in FIG. 14, an auxiliary optical component 33' is arranged, which is covered by the protective layer 4.

Figure 16:
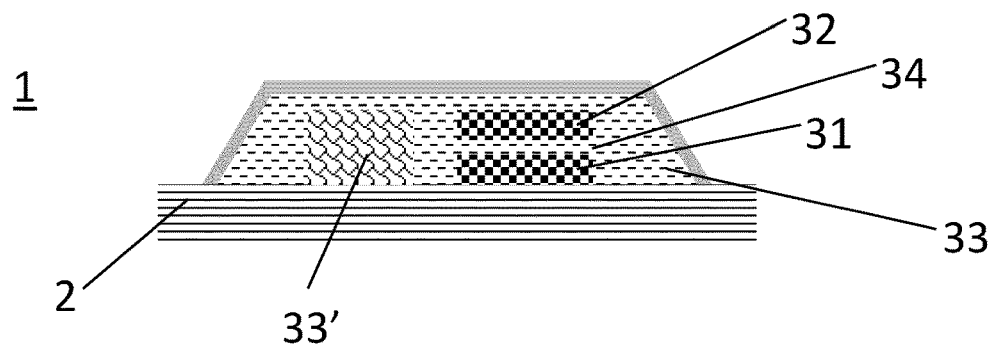

FIG. 16 shows schematically a plasmonic device 1 in accordance with some embodiments of the invention. In contrast to plasmonic device shown in FIG. 15, the organic optical material covers the inorganic confining structures 31, 32 and the auxiliary optical component 33'. The protective layer 4 covers the organic optical material 33.

In accordance with some embodiments of the invention, the first inorganic confining structure 31 or the second inorganic confining structure 32 is formed from a dielectric or semiconducting material for providing a hybrid plasmonic waveguide.

Figure 17:
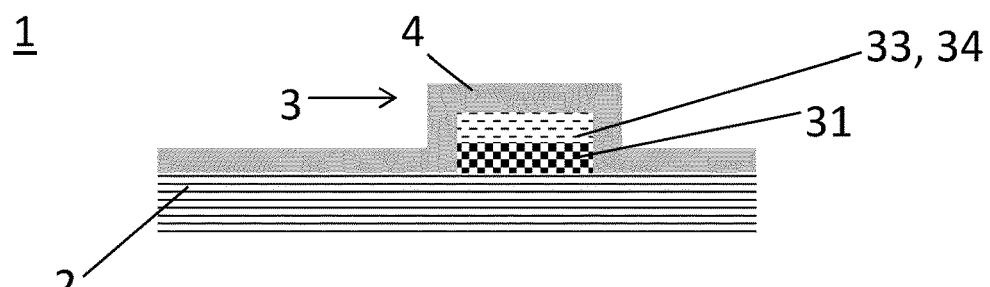

FIG. 17 shows schematically a plasmonic device 1 in accordance with some embodiments of the invention. In contrast to the plasmonic device shown in FIG. 14, a first inorganic confining structure 31 is arranged on the substrate 2 and the organic optical material 33 is arranged on the first electrode 31. The first inorganic confining structure 31 and the organic optical material 33 form the plasmonic section 3. The substrate 2 and the plasmonic section 3 are covered by the protective layer 4.

Figure 18:
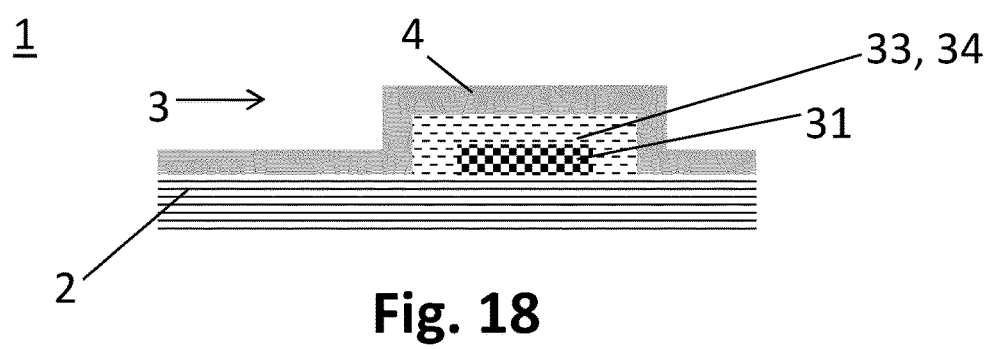

FIG. 18 shows schematically a plasmonic device 1 in accordance with some embodiments of the invention. In contrast to the plasmonic device shown in FIG. 17, the organic optical material 33 is also arranged on the substrate 2.

Figure 19:
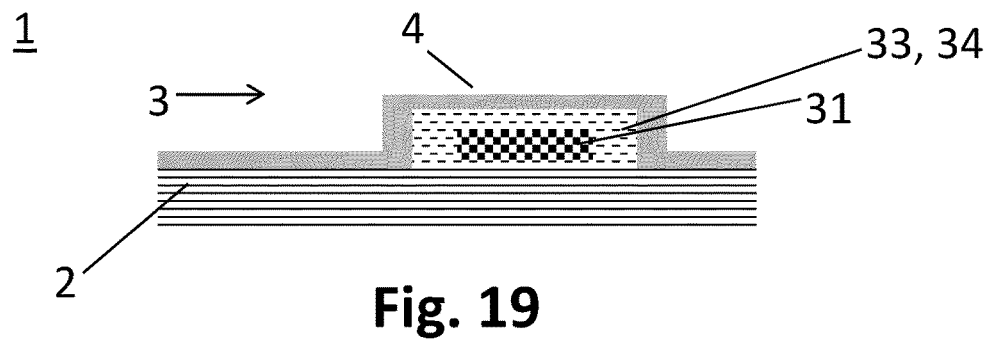

FIG. 19 shows schematically a plasmonic device 1 in accordance with some embodiments of the invention. In contrast to the plasmonic device shown in FIG. 18, the first inorganic confining structure 31 is not arranged on the substrate 2, but embedded in the organic optical material 33.

FIGS. 17-19 show plasmonic devices 1 which may provide long-range plasmonic wave guiding.

Figure 20:
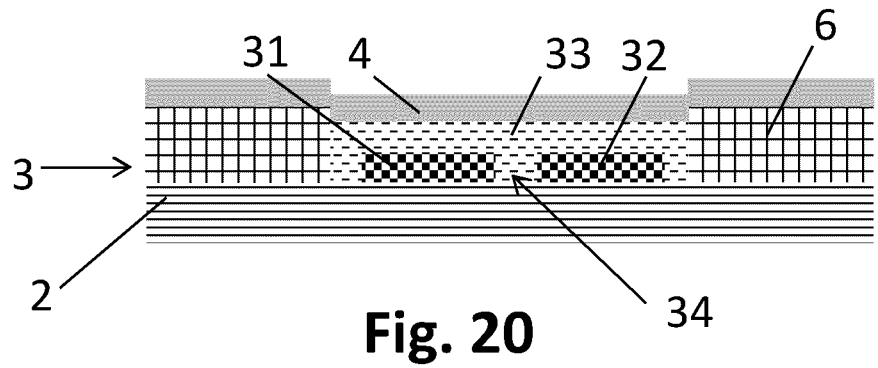

FIG. 20 illustrates schematically a plasmonic device 1 in accordance with various embodiments of the invention. A cladding 6 is arranged on the substrate 2. The plasmonic section 3 is arranged on the substrate 2, wherein the organic optical material 33 and the cladding 6 have different levels with respect to the substrate 2. The protective layer 4 is arranged on the organic optical material 33 and the cladding 6, thereby following the different levels. The cladding 6 may be arranged in a first process step, the cladding 6 may be removed in a second process step for enabling arranging the plasmonic section 3 in a third process step. The protective layer may be arranged in a fourth process step.

Figure 21:
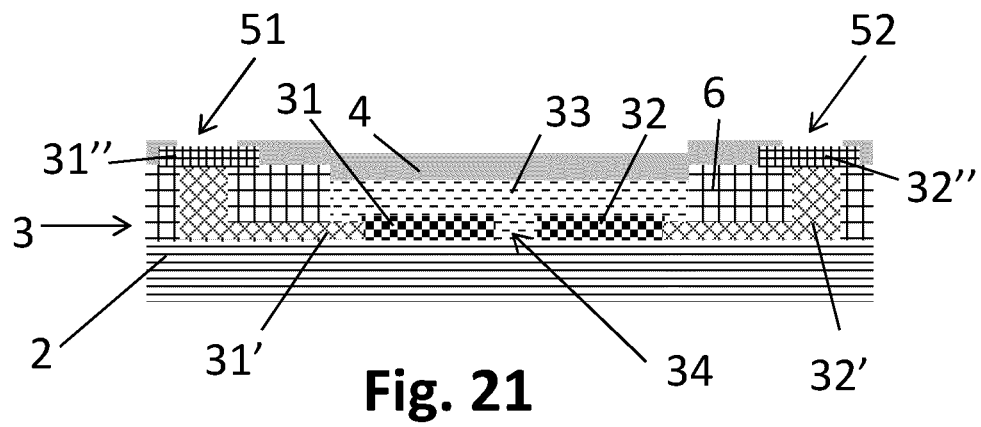

FIG. 21 illustrates schematically a plasmonic device 1 in accordance with various embodiments of the invention. The plasmonic device 1 corresponds to the plasmonic device 1 illustrated in FIG. 20. In contrast to the plasmonic device 1 illustrated in FIG. 20, auxiliary components 31', 32' are arranged adjacent to the inorganic confining structures 31, 32. The auxiliary components 31', 32' extend through the cladding 6 to further components 31", 32", for example, in order to provide electrical connections to the inorganic confining structures 31, 32.

Finally, it should be noted that the term "comprising" does not exclude other elements or steps and the "a" or "an" does not exclude a plurality. Also, elements described in association with different embodiments may be combined. It should also be noted that reference signs in the claims should not be construed as limiting the scope of the claims.

The invention claimed is:

1. A plasmonic device comprising
a substrate,
a plasmonic section arranged on the substrate, the plasmonic section including at least one inorganic confining structure adjacent to an organic optical material providing a plasmonic waveguide, wherein the organic optical material is arranged in a limited area, and
a protective layer covering and/or enclosing the organic optical material,
wherein the protective layer has a water-vapor transmission rate below at least one of $1\times10^{-1}$ g/(m² day), $1\times10^{-3}$ g/(m² day), and $1\times10^{-5}$ g/(m² day).

2. A plasmonic device comprising
a substrate,
a plasmonic section arranged on the substrate, the plasmonic section including at least one inorganic confining structure adjacent to an organic optical material providing a plasmonic waveguide, wherein the organic optical material is arranged in a limited area, and
a protective layer covering and/or enclosing the organic optical material,
wherein the protective layer has an oxygen permeation rate below at least one of 100 cm³/(m² day), $1\times10^{-0}$ cm³/(m² day), $1\times10^{-2}$ cm³/(m² day), and $1\times10^{-4}$ cm³/(m² day).

3. A plasmonic device comprising
a substrate,
a plasmonic section arranged on the substrate, the plasmonic section including at least one inorganic confining structure adjacent to an organic optical material providing a plasmonic waveguide, wherein the organic optical material is arranged in a limited area, and
a protective layer covering and/or enclosing the organic optical material,
wherein the protective layer includes a combination of an inorganic material and an organic material.

4. The plasmonic device of claim 1 wherein the protective layer includes a nano-laminate.

5. The plasmonic device of claim 1 wherein the organic optical material partially covers the inorganic confining structures.

6. The plasmonic device of claim 1 wherein the limited area of the organic optical material is at least ten times smaller than an area of the substrate.

7. The plasmonic device of claim 1 having two inorganic confining structures with a gap between them, wherein the limited area of the organic optical material is at least ten times larger than an area of the gap.

8. The plasmonic device of claim 1 wherein the protective layer includes at least one of glass, aluminum nitride, Al2O3, HfO2, SiO2, ZrO2, ZnO, SiN, silicon oxynitride, TiO2, TiN, and organic materials.

9. The plasmonic device of claim 1 wherein the protective layer is structured to only partially extend over the inorganic confining structures.

10. A plasmonic device comprising
a substrate,
a plasmonic section arranged on the substrate, the plasmonic section including at least one inorganic confining structure adjacent to an organic optical material providing a plasmonic waveguide, wherein the organic optical material is arranged in a limited area, and
a protective layer covering and/or enclosing the organic optical material,
wherein the protective layer includes a first protective sublayer and a second protective sublayer, and
wherein the protective sublayers include different materials.

11. A plasmonic device comprising
a substrate,
a plasmonic section arranged on the substrate, the plasmonic section including more than one inorganic confining structure adjacent to an organic optical material providing a plasmonic waveguide, wherein the organic optical material is arranged in a limited area, and wherein the confining structures comprise electrodes, and
a protective layer covering and/or enclosing the organic optical material,
auxiliary electrical components, and
further auxiliary components,
wherein the auxiliary electrical components form electrical lines providing an electrical connection between the further auxiliary components and the inorganic confining structures, and
wherein the electrodes are covered by the protective layer, and
wherein the auxiliary electrical components are partially covered by the protective layer, thereby providing access to the auxiliary electrical components.

12. A method for fabricating a plasmonic device, the method comprising:
providing a substrate,
arranging on the substrate a plasmonic section which includes at least one inorganic confining structure adjacent to an organic optical material for providing a plasmonic waveguide, wherein the organic optical material is arranged in a limited area, and
depositing a protective layer for covering and/or enclosing the organic optical material for improved reliability of the plasmonic waveguide, wherein
the protective layer is deposited by means of one or more thin film deposition processes including at least one of an atomic layer deposition process, a sputtering process, and a molecular layer deposition process.

13. A method for fabricating a plasmonic device, the method comprising:
providing a substrate,
arranging on the substrate a plasmonic section which includes at least one inorganic confining structure adjacent to an organic optical material for providing a plasmonic waveguide, wherein the organic optical material is arranged in a limited area, and depositing a protective layer for covering and/or enclosing the organic optical material for improved reliability of the plasmonic waveguide, wherein the protective layer is manufactured with a structured design using at least one of a lithographic process and a masking process.

14. The method of claim 13 comprising the step of removing areas or sections of the protective layer where the protective layer is not required.

15. A method for fabricating a plasmonic device, the method comprising:

providing a substrate, arranging on the substrate a plasmonic section which includes at least one inorganic confining structure adjacent to an organic optical material for providing a plasmonic waveguide, wherein the organic optical material is arranged in a limited area, and depositing at least one protective layer for covering and/or enclosing the organic optical material for improved reliability of the plasmonic waveguide, wherein the depositing of the at least one protective layer comprises:

depositing a first protective layer, followed by wire-bonding, and followed by depositing a second protective layer.

16. A method for fabricating a plasmonic device, the method comprising:

providing a substrate, arranging on the substrate a plasmonic section which includes at least one inorganic confining structure adjacent to an organic optical material for providing a plasmonic waveguide, wherein the organic optical material is arranged in a limited area, and depositing a protective layer for covering and/or enclosing the organic optical material for improved reliability of the plasmonic waveguide, wherein the protective layer is deposited in a deposition process applied at temperatures of at least one of: below 200° C., below 140° C., and below 100° C.

17. The method of claim 15 further comprising the steps depositing a first and a second protective layer using different deposition processes.

18. A method for fabricating a plasmonic device, the method comprising:

providing a substrate, arranging on the substrate a plasmonic section which includes at least one inorganic confining structure adjacent to an organic optical material for providing a plasmonic waveguide, wherein the organic optical material is arranged in a limited area, and depositing a protective layer for covering and/or enclosing the organic optical material for improved reliability of the plasmonic waveguide, wherein the depositing of the protective layer comprises:

depositing a plurality of protective sublayers and using one or more of the protective sublayer as a mask for structuring the organic optical material in the limited area.

19. The plasmonic device of claim 1 wherein the protective layer fully encloses the organic optical material.

20. The plasmonic device of claim 1 with more than one inorganic confining structure, wherein the organic optical material is an electro-optic material and the inorganic confining structures are electrodes or are electrically contacted to electrodes.

21. The plasmonic device of claim 1 wherein the organic optical material is an organic nonlinear optical material having second-order nonlinearity.

22. The method of claim 16, wherein the organic optical material is arranged using one or more of a local deposition process and a combination of a deposition process and a structuring process.

23. The method of claim 16, wherein the protective layer is deposited using one or more thin film deposition processes.

24. The method of claim 16 comprising the step of depositing the protective layer to fully enclose the organic optical material.

25. The method of claim 16 comprising the step of using a combination of a deposition process and a structuring process to arrange the organic optical material in the limited area.

26. The method of claim 25 wherein the combination of the deposition process and the structuring process comprises at least one of an ink-jet printing process, an aerosol printing process, a drop-casting process, a dispensing process, an etching process, a lift-off process, a local growth process, a mechanical or thermal structuring process, a masking process, and a lithographic process.

27. The method of claim 16 comprising the step of arranging the organic optical material in the limited area by means of spin-coating in combination with a lithographic process.

* * * * *